US008924439B2

(12) United States Patent
Arena

(10) Patent No.: US 8,924,439 B2
(45) Date of Patent: Dec. 30, 2014

(54) SYSTEM FOR AND METHOD OF PARTIAL FILE HASHING

(75) Inventor: Scott David Arena, Peabody, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 209 days.

(21) Appl. No.: 12/552,016

(22) Filed: Sep. 1, 2009

(65) Prior Publication Data

US 2011/0055179 A1     Mar. 3, 2011

(51) Int. Cl.
G06F 7/00        (2006.01)
G06F 17/00       (2006.01)
G06F 17/30       (2006.01)
H04L 9/32        (2006.01)

(52) U.S. Cl.
CPC ........... *H04L 9/3239* (2013.01); *H04L 2209/80* (2013.01)
USPC .......................................... 707/822; 707/698

(58) Field of Classification Search
CPC ................................................ G06F 17/30949
See application file for complete search history.

(56) References Cited

U.S. PATENT DOCUMENTS

| 6,594,665 | B1 * | 7/2003 | Sowa et al. ............................ 1/1 |
| 6,704,730 | B2 * | 3/2004 | Moulton et al. ....................... 1/1 |
| 2003/0120647 | A1 * | 6/2003 | Aiken et al. ....................... 707/3 |
| 2006/0095521 | A1 * | 5/2006 | Patinkin ........................ 709/206 |
| 2008/0133446 | A1 * | 6/2008 | Dubnicki et al. ................. 707/1 |
| 2008/0167055 | A1 * | 7/2008 | Willey et al. .................. 455/458 |
| 2009/0013129 | A1 * | 1/2009 | Bondurant .................... 711/115 |
| 2010/0217953 | A1 * | 8/2010 | Beaman et al. ............... 711/216 |

OTHER PUBLICATIONS

Rivest, R., "The MD5 Message-Digest Algorithm", MIT Laboratory for Computer Science and RSA Data Security, Inc., Apr. 1992, 21 pages, Retrieved from the Internet at: http://www.ietf.org/rfc/rfc1321.txt?number=1321.

* cited by examiner

*Primary Examiner* — Sherief Badawi
*Assistant Examiner* — Loan T Nguyen

(57) ABSTRACT

A system for and method of partial file hashing is presented. The system and method may generate a hash table file using a hash algorithm on portions of a file before transmitting the file. The receiving system may calculate hash values on one or more portions of a file and compare the values to the values in the hash table file.

17 Claims, 5 Drawing Sheets

| Point | Hash Value |
|---|---|
| 1 | 826e8142e6baabe8af779f5f490cf5f5 |
| 2 | 6d0f202ebea2b88ddfebcee2385d0389 |
| 3 | 94868e9e40aa9bbcd14f7ef40b39c46f |
| 4 | 596261be96086e8b95fb758fdabad3e0 |
| 5 | 4dfd3a655ca7d7f80e6bbaf471992cb1 |

SYSTEM FOR AND METHOD OF PARTIAL FILE HASHING

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

When transmitting or storing files, it is advantageous to store or transmit a hash value of the file to verify with high confidence that the received transmitted file and the retrieved stored file are identical to the originally transmitted file and the originally stored file respectively. A hash algorithm calculates a hash value from a file. If the hash value of the file is identical to a hash value of a copy of the file, or a hash value of the original file, then it can be determined with a high degree of confidence that the two files are bit-for-bit copies, or that the original file has not been altered over time. However, calculating the hash value of a large file is expensive in terms of time and processor and/or memory usage.

BRIEF SUMMARY OF THE INVENTION

A system for and method of partial file hashing is presented. The system and method may generate a hash table file using a hash algorithm on portions of a file before transmitting the file. The receiving system may calculate hash values on one or more portions of a file and compare the values to the values in the hash table file.

BRIEF DESCRIPTION OF THE SEVERAL VIEWS OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF THE INVENTION

A system and method may apply one or more hash algorithms to two or more portions of a file to generate one or more hash values. The hash values created by the hash algorithm may be stored in a hash table file, and the file and the hash table file may be transmitted to a receiving system 108.

The receiving system 108 may read the hash table file and begin reading the file. When the receiving system 108 processes the same portion of a file used to create an entry in the hash table file, the receiving system 108 may apply a hash algorithm to the portion of the file, and may compare the hash value generated to the hash value associated with the portion of the file in the hash table file. If the two values match, then it is likely that the portions of the files are identical. If the two values do not match, then it is likely that the file has changed during transmission. A changed file may have been corrupted during transmission, and the receiving system 108 may stop reading the file and alert a user or request retransmission. If a file becomes corrupted during transmission, an initial segment may be corrupted during the beginning of the transmission. By creating hash values of smaller portions of the file, the receiving system 108 may only process a smaller portion in order to determine file corruption, rather than processing the entire file to compute a single hash value.

Figure 1:
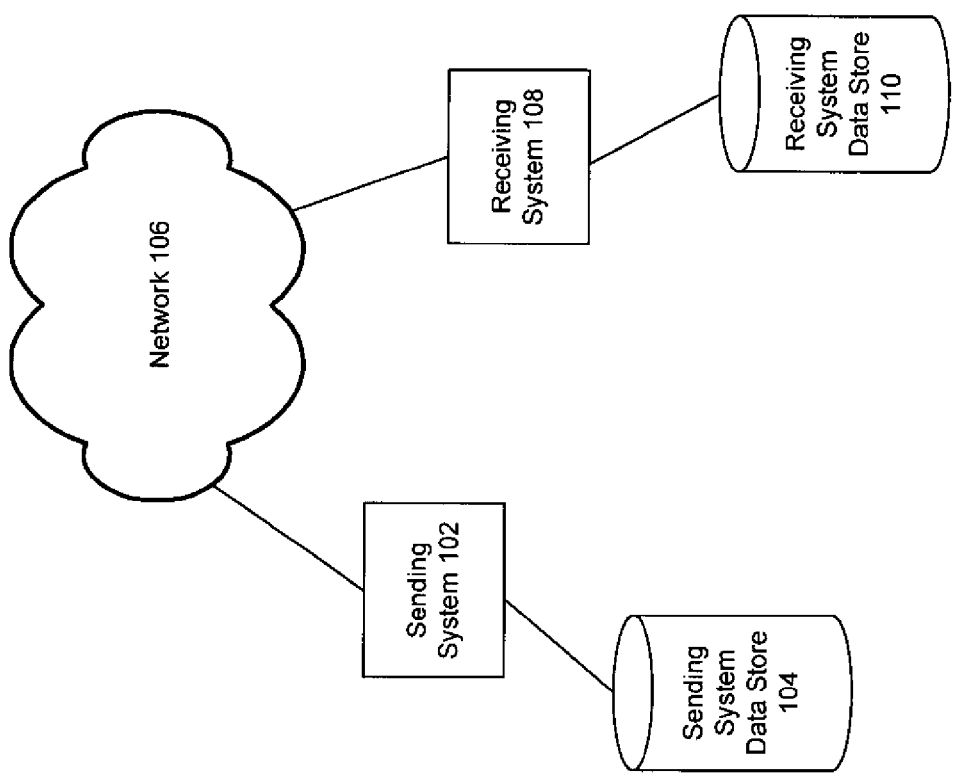
FIG. 1 is a schematic diagram illustrating a system according to a particular embodiment.

FIG. 1 is a schematic diagram illustrating a system 100 according to particular embodiments. A sending system 102 may be in communication with a sending system data store 104. The sending system 102 may also be in communication with a network 106. A receiving system 108 may be in communication with a receiving system data store 110, and may also be in communication with the sending system 102 via the network 106.

The sending system 102 and the receiving system 108 may include one or more processors (not shown) for recording, transmitting, receiving, and storing data. The sending system 102 and the receiving system 108 may transmit signals to the network 106, receive signals from the network 106, and store and access data from respective data stores. The sending system 102 and the receiving system 108 may be similar or identical combinations of hardware and/or software, or may include different hardware and/or software. The sending system 102 and the receiving system 108 may be electronically controlled using instructions embodied in software, or may be controlled using instructions embodied in hardware, or a combination of software and hardware may be used to operate the sending system 102 and the receiving system 108.

The sending system data store 104 and the receiving system data store 110 may be network accessible storage and may be local, remote, or a combination thereof to the receiving system 108 and the sending system 102. The sending system data store 104 and the receiving system data store 110 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, the sending system data store 104 and the receiving system data store 110 may be a database, such as an Oracle database, a Microsoft SQL Server database, a DB2 database, a MySQL database, a Sybase database, an object oriented database, a hierarchical database, or other database. The sending system data store 104 and the receiving system data store 110 may utilize flat file structures for storage of data. The sending system data store 104 and the receiving system data store 110 may be different. For example, the sending system data store 104 and the receiving system data store 110 may utilize different file systems, file structures, databases, or hardware. While the sending system data store 104 is shown separate from the sending system 102, and the receiving system data store 110 is shown separate from the receiving system 108, the data stores and the respective systems may be at the same physical location, or may reside within the same housing.

Network 106 may be a wireless network, a wired network or any combination of wireless network and wired network. For example, network 106 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 106 may include, without limitation, telephone line, fiber optics, IEEE Ethernet 802.3, a wide area network ("WAN"), a local area network ("LAN"), or a global network such as the Internet. Also, network 106 may support, an Internet network, a wireless communication network, a cellular network, or the like, or any combination thereof. Network 106 may further include one, or any number of the exemplary types of networks mentioned above operating as a stand-alone network or in cooperation with each other. Network 106 may utilize one or more protocols of one or more network elements to which it is communicatively coupled. Network 106 may translate to or from other protocols to one or more protocols of network devices. Although network 106 is depicted as one network, it should be appreciated that according to one or more embodiments, network 106 may comprise a plurality of interconnected networks, such as, for example, a service provider network, the Internet, a broadcaster's network, a cable television network, corporate networks, and home networks. Network 106 may also be a direct link between the receiving system 108 and the sending system 102.

Sending system 102, receiving system 108, sending system data store 104, and receiving system data store 110 may transmit and receive data via network 106. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 106 may use standard wireless protocols including IEEE 802.11a, 802.11b and 802.11g. Network 106 may also use protocols for a wired connection, such as IEEE Ethernet 802.3.

Figure 2:
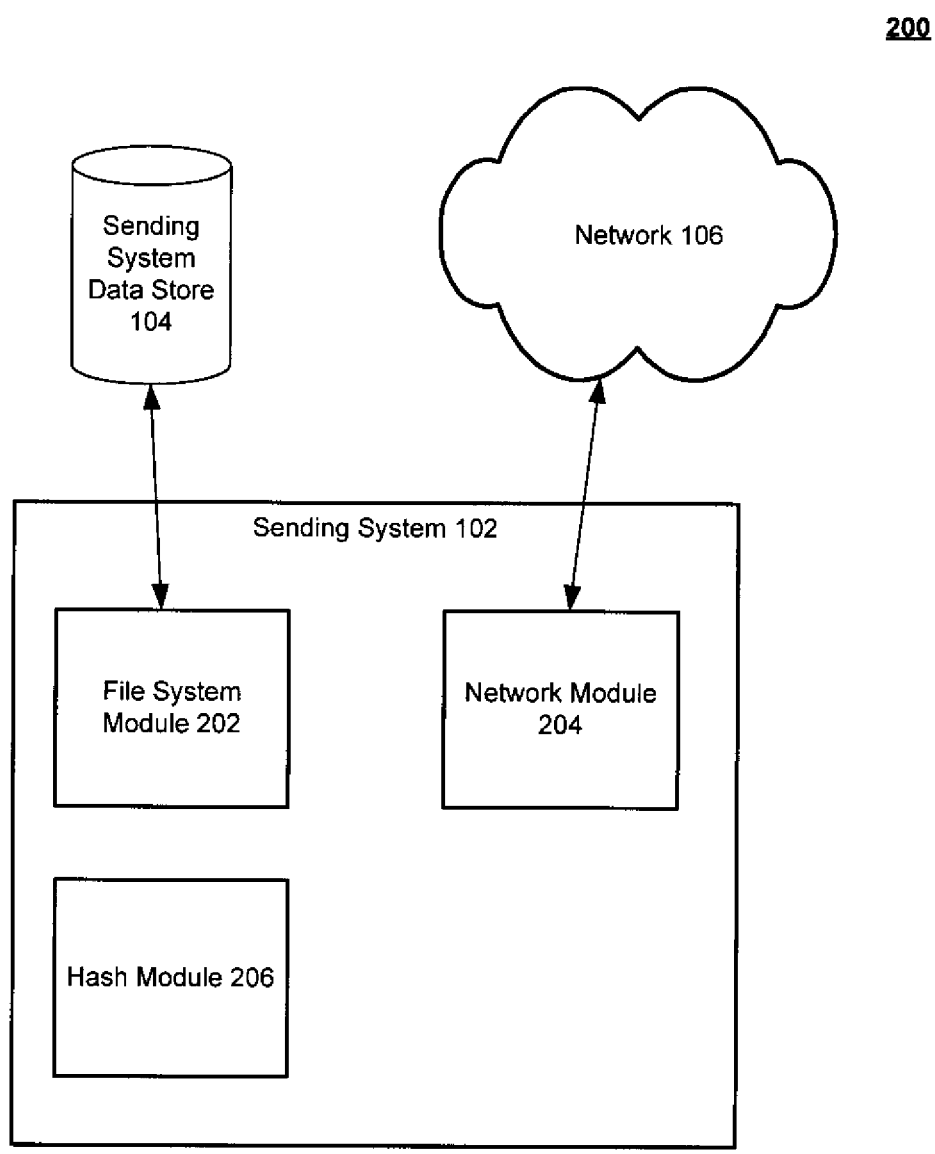
FIG. 2 is a block diagram of a hardware component of the system of a particular embodiment.

FIG. 2 is a block diagram 200 of a hardware component of the system of a particular embodiment. While FIG. 2 is discussed with reference to the sending system 102, the elements of FIG. 2 may also appear in the receiving system 108. The sending system 102 may comprise one or more modules. The modules may be in communication with each other. The modules may reside on the same physical system, or may reside on more than one physical system, and may be in communication with each other via the network 106 or other connection. The modules may be distinct and may be in communication with each other, or functions of the modules may be embodied in a combination of the modules. The sending system 102 may comprise a file system module 202, a network module 204, and a hash module 206.

The file system module 202 may be operable to communicate with sending system data store 104. The file system module 202 may receive file requests from the sending system 102 or the network module 204, and may communicate the file requests to the sending system data store 104. The file system module 202 may transmit a request to the sending system data store 104. The request may encompass, for example and without limitation, a read request or a write request. The file system module 202 may be operable to read data from the sending system data store 104 and may also be operable to write data to the sending system data store 104.

The network module 204 may be in communication with the network 106. The network module 204 may transmit information to other systems via the network 106, and may receive information from other systems via the network 106. The network module 204 may be in communication with the file system module 202 to store or retrieve information to the sending system 102 data storage.

The hash module 206 may receive an input and generate a hash value based on the input. The input may comprise all or a portion of a file, or other information not stored in a file. The hash module 206 may utilize a hash algorithm to generate the hash value. For example, and without limitation, hash algorithms may receive an input, and operate upon the input to generate a hash value. The hash algorithm may be designed so that two identical inputs will always have the same hash value but that it is unlikely that two distinct inputs will have the same hash value. For example, and without limitation, the hash algorithm may be the Message Digest 5 ("MD5") algorithm, or any of the algorithms in the Secure Hash Algorithm family, for example SHA-1. Other hash algorithms may also be used. The hash module 206 may utilize one or more hash algorithms.

The hash module 206 may be operable to receive a portion of an entire file as an input, so that, for example, the first 2,000 bytes of a file may be used as an input, even if the file size is 4,000 bytes. The hash module 206 may also be operable to create more than one hash value according to one or more portions of a file. For example, the file may be broken up into one or more file break points. The file break points may specify which portions of a file may be used as an input to generate a hash value. The hash function may receive specific file break points, or may generate file break points according to an algorithm. For example, and without limitation, the hash module 206 may calculate file break points for every five percent of a file, starting at the beginning of the file. Or, the hash module 206 may calculate file break points at specific file sizes. For example, and without limitation, the hash module 206 may calculate file break points for every 5 megabytes of a file.

The hash module 206 may output the hash value to the sending system 102 by creating a hash table with file break point information and hash values associated with the file break points, or may operate with the network module 204 and/or the file system module 202 to transmit the hash value and file break point information to another system. File break point information may comprise the amount of the file that was used to create the associated hash value, or the number of the file break point and information regarding the division of the file into one or more file break points.

Figures 3A, 3B:
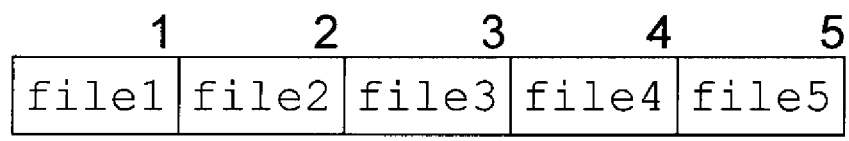
FIG. 3a is an exemplary file that may be used by a particular embodiment to generate a hash table file.
FIG. 3b is an exemplary hash table file generated by a particular embodiment.

FIG. 3a is an exemplary file that may be used by a particular embodiment to generate a hash table file. The file shown in FIG. 3a is exemplary only; a file may be of any length. The file may be 25 characters long, comprising the character string "file1file2file3file4file5." In the example file, five file break points are shown. Five break points may be specified to the hash module 206 to create the five file break points, or the hash module 206 may have been instructed to create a file break point at every 20% of the file. File break point 1 yields a portion of the file comprising the string of characters "file1." File break point 2 yields a portion of the file comprising the string of characters "file1file2." File break point 3 yields a portion of the file comprising the string of characters "file1file2file3." File break point 4 yields a portion of the file comprising the string of characters "file1file2file3file4." File break point 5 yields a portion of the file comprising the string of characters "file1file2file3file4file5," or the entire file. Other file break points may be specified, and either more file break points or fewer file break points may be specified, yielding portions of differing or unequal lengths.

FIG. 3b is an exemplary hash table file generated by a particular embodiment. By way of example, the MD5 hash algorithm generates a 32-bit hexadecimal string as a hash value. Applying the MD5 hash algorithm to the string "file1" of file break point 1 may generate a hash value of "826e8142e6baabe8af779f5f490cf5f5." Applying the MD5 hash algorithm to the string "file1file2" of file break point 2 may generate a hash value of "6d0f202ebea2b88ddfebcee2385d0389." Applying the MD5 hash algorithm to the string "file1file2file3" of file break point 3 may generate a hash value of "94868e9e40aa9bbcd14f7ef40b39c46f." Applying the MD5 hash algorithm to the string "file1file2file3file4" of file break point 4 may generate a hash value of "596261be96086e8b95fb758fdabad3e0." Applying the MD5 hash algorithm to the string "file1file2file3file4file5" of file break point 5 may generate a hash value of "4dfd3a655ca7d7f80e6bbaf471992cb1." The hash module 206 may associate the file break points 304 with the associated hash value 306, and may store the file break points 304 and the associated hash values 306 in a table form as shown in FIG. 3b.

The receiving system 108 may have the same or similar modules as the sending system 102, and may include at least a network module 204 for receiving signals from a network 106, a file system module 202 for communicating with the receiving system data store 110, and a hash module 206 operable to read a hash table file and apply a hash algorithm to one or more portions of a file. After the hash table file is created, the hash table file may be saved to the sending system data store 104, or the hash table file may be transmitted to another system. For example, the hash table file may be transmitted to the receiving system 108. The file and the hash table file may be transmitted to the receiving system 108 via the network 106. The hash table file may be transmitted before the file is transmitted, or the hash table file may be transmitted after the file is transmitted. The receiving system 108 may receive the hash table file and the file. The receiving system 108 may read the hash table file and break the file into the same file break points as specified in the hash table file. When a file break point is reached, the receiving system 108 uses the same hash algorithm as the sending system 102 used to create the hash table file, or another output indistinguishable algorithm. If the hash value generated by the hash module 206 of the receiving system 108 matches the hash value generated by the hash module 206 of the sending system 102, it is likely that the portion of the file specified by the file break point is an identical copy of the portion of the file specified by the file break point sent by the sending system 102. If the hash values are different, it is likely that the portion of the file specified by the file break point is not an identical copy of the portion of the file specified by the file break point sent by the sending system 102. If the two file portions are not the same, the receiving system 108 may alert a user that the files are not identical, or may perform other actions. For example, the receiving system 108 may request that the sending system 102 resend the file.

Figure 4:
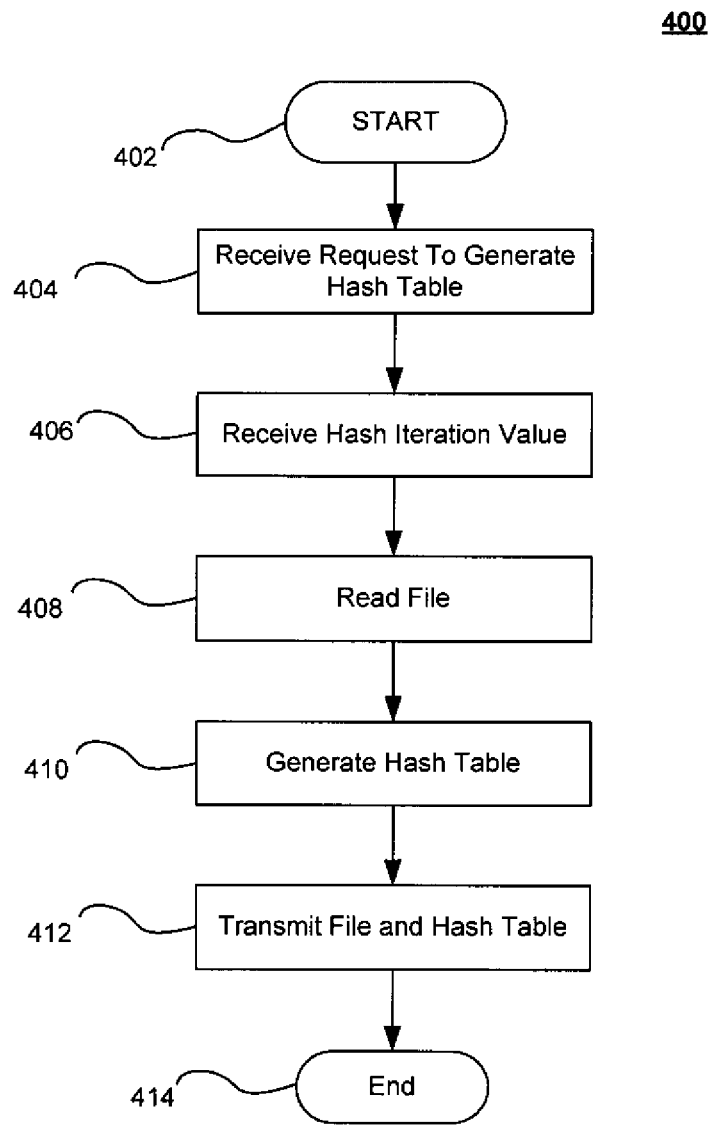
FIG. 4 is a flowchart illustrating the creation of a hash table file according to a particular embodiment.

FIG. 4 is a flowchart illustrating the creation of a hash table file according to a particular embodiment The method 400 may begin at step 402. In step 404, the sending system may receive a request to generate a hash table. The request may be from, for example and without limitation, a system user or administrator, or the request may be automatic when preparing to transmit a file or files to a receiving system. The receiving system may receive the file name and path in the file system to the file, or the receiving system may receive other identifying information related to a file. For example, if the file is stored in a database, the sending system may receive information so that the sending system can retrieve or cause another system to retrieve the file from the database.

In step 406, the sending system may receive a hash iteration value. The hash iteration value may be the number of hash points that the sending system may generate. Hash points may also be known as file break points. The sending system may divide the size of the file by the hash iteration value to identify file break points. For example, if the file identified was 100 gigabytes, and the hash iteration value was 5, then the sending system may identify file break points at 20 gigabytes, 40 gigabytes, 60 gigabytes, 80 gigabytes, and 100 gigabytes. In another embodiment, the hash iteration value may specify a size. For example, if the file identified was 100 gigabytes, and the hash iteration value was 10 gigabytes, then the sending system may identify file break points at 10 gigabytes, 20 gigabytes, 30 gigabytes, 40 gigabytes, 50 gigabytes, 60 gigabytes, 70 gigabytes, 80 gigabytes, 90 gigabytes, and 100 gigabytes. In another embodiment, the hash iteration value may be a series of percentages. For example, the hash iteration value may be 30%, 60%, and 100%. The sending system may use the percentages and the file size to calculate file break points. For example, if the file identified was 100 gigabytes, and the hash iteration values were 30%, 60%, and 100%, the sending system may create file break points at 30 gigabytes, 60 gigabytes, and 100 gigabytes. In another embodiment, the hash iteration value may be a series of file sizes. The sending system may use the file sizes to create file break points. For example, if the hash iteration values were 5 kilobytes, 7 kilobytes, and 10 kilobytes, the sending system may create file break points at 5 kilobytes, 7 kilobytes, and 10 kilobytes. If the file was larger than 10 kilobytes, the sending system may also include a file break point at the end of the file. If the file was smaller than 10 kilobytes, for example if the file was 8 kilobytes, the sending system may only include the hash iteration values within the size of the file. The sending system may also create a hash value corresponding to the entire file, and may include the hash value with the hash table file.

In step 408, the sending system may read the file. When the sending system comes to a file break point, the sending system may calculate a hash value of the file to the file break point. The hash value may be calculated according to one or more hashing algorithms. A hashing algorithm may generate a hash value, so that it is unlikely that two files or portions of files may have an identical hash value unless the two files or portions of files are identical. For example, and without limitation, the Message Digest "MD5" hashing algorithm may be used to calculate a hash value. Other hash algorithms may also be used. For example, and without limitation, any of the algorithms in the family of Secure Hash Algorithms "SHA" may be used. The file break point and the hash value at the file break point may be copied to a hash file. In another embodiment, the file break point and the hash value may be stored in memory or transmitted to another system.

In step 410, the file break points and the hash values associated with the file break points may be copied to a hash table. The hash table may be saved as a hash table file. The hash table file may be associated with the file. The file break points may be recorded to the hash table file, or other information related to the file break points may be recorded the hash table file. For example, the hash table file may record the number of bytes starting at the beginning of the file where each of the file break points was created. For example, a hash table file entry comprising "4,025" and a hash value, may indicate that a hash algorithm using the first 4,025 bytes of a file yielded a specific hash value. The hash table file may include the percentage of bytes or other units that were used by the hash algorithm to generate the hash value. For example, a hash table file entry comprising "60" or "60%" and a hash value may indicate that a hash algorithm using the first 60% of bytes at the beginning of the file yielded the specific hash value. In an embodiment, the hash table file may record the hash iteration if a hash iteration value specifying a number of file break points was given. For example, a hash table file entry of "1" and a hash value may indicate that a hash algorithm using the bytes of the file from the beginning to the first file break point yielded the specific hash value. The total number of file break points, or the hash iteration value, may be specified in the hash table file, or the total number of entries in the hash table file may be used to find the total number of file break points used to generate the hash table file. In an embodiment, the hash table file may include the name or other information to identify the hash algorithm used to create the hash values.

In step 412, the file and the hash table file may be transmitted to a receiving system. The transmission may occur, for example, over a network, where the receiving system and the sending system may be associated with the network. In another embodiment, the file and the hash table file may be stored on storage associated with the sending system and may not be transmitted to the receiving system, or only the file or the hash table file may be transmitted to the receiving system. The method may end at step 414.

Figure 5:
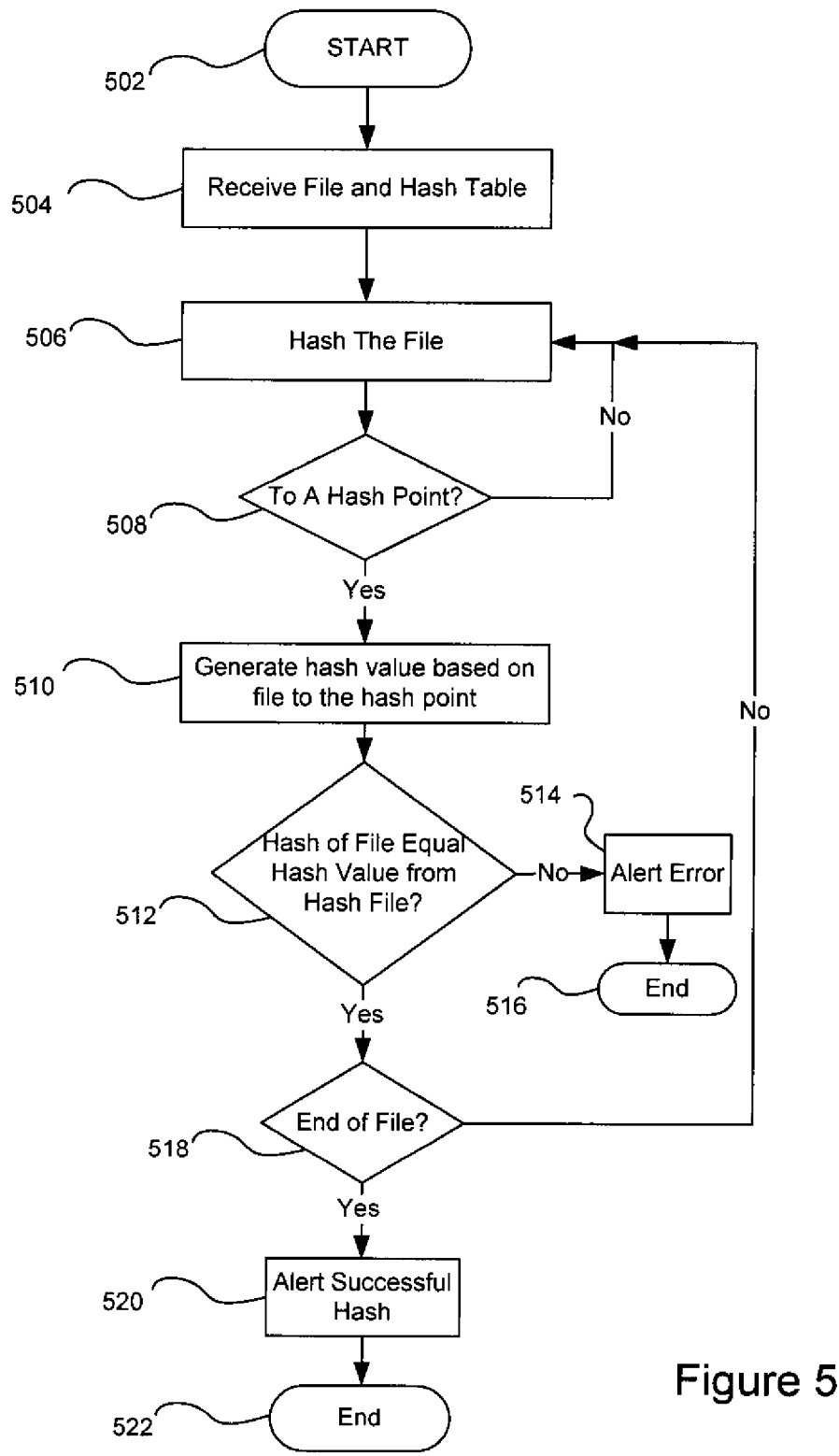
FIG. 5 is a flowchart illustrating an incremental hashing of a file using a hash table file according to a particular embodiment.

FIG. 5 is a flowchart illustrating an incremental hashing of a file using a hash table file according to a particular embodiment. The method 500 may begin at step 502. At step 504, the receiving system may receive a file and a hash table file associated with the file. The receiving system may read the hash table file to determine the file break points used to calculate the hash values in the hash table file.

In step 506, the receiving system may begin reading the file. In step 508, if the receiving system is at a file break point, the receiving system may continue to step 510. If the receiving system is not at a file break point, the receiving system may continue to step 506 and read more of the file.

In step 510, the receiving system has read the file to a file break point in the hash table file. The receiving system may then apply the hash algorithm used by the sending system to generate a hash value. In step 512, the receiving system may then compare the hash value generated from the file break point to the hash value read from the hash table file corresponding to the same file break point. If the two hash values do not match, the method may proceed to step 514. If the two hash values match, then the method may proceed to step 518.

In step 514, the hash value generated by the receiving system at a file break point does not match the hash value entry in the hash table file corresponding to the same file break point. The inequality of the two hash values may indicate that the file received by the receiving system is not identical to the file transmitted by the sending system, which may be an indication that the file was corrupted during transport from the sending system to the receiving system. The receiving system may note the error, and may alert an operator of the receiving system. For example, the receiving system may output one or more messages to a screen, or create a message and save the message to one or more log files, or may alert an operator in another way. The receiving system may delete the file and the hash table file. The receiving system may request that the sending system retransmit the file and the hash table file. The method may end at step 516. In another embodiment, the receiving system may request that the sending system retransmit the hash table file, and then compare the originally transmitted hash table file to the retransmitted hash table file. If the two files are not identical because, for example, the hash table file was corrupted during transmission to the receiving system, the receiving system may begin at step 502, substituting the retransmitted hash table file for the original hash table file.

In step 518, if the end of the file is reached, or if each of the hash values in the hash table file are identical to hash values calculated by the receiving system, the file received by the receiving system is presumed to be identical to the file transmitted by the sending system, and the method may alert a user or system of a successful hash at step 520 and may end at step S20522. If file break points remain to be evaluated in the hash table file, then the method may return to step 506 to read and evaluate additional portions of the file.

It is to be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

SEQUENCE LISTING

Not Applicable

I claim:

1. A method, comprising:
receiving a hash iteration value, and a request for an electronic file;
identifying the requested electronic file;
at least one computer processor determining two or more hash points in a portion of the requested electronic file based on the hash iteration value; and
for each of the two or more hash points:
the at least one computer processor reading the portion of the electronic file from a beginning of the portion of the requested electronic file to the hash point;
the at least one computer processor electronically calculating a hash value based on the portion of the electronic file read from the beginning of the portion of the requested electronic file to the hash point;
the at least one computer processor outputting the hash value into an electronic hash table file; and
transmitting, by the at least one computer processor, the requested electronic file and the electronic hash table file over a computer network to a receiving system.

2. The method of claim 1, wherein the requested electronic file is associated with a file size, and the two or more hash points are determined by calculating two or more percentages based at least on the size of the requested electronic file.

3. The method of claim 1, wherein the requested electronic file is associated with a file size, and the two or more hash points are determined by static sizes.

4. The method of claim 1, wherein a Message Digest algorithm is used to calculate the hash value for each of the two or more hash points.

5. The method of claim 1, wherein a Secure Hash Algorithm family algorithm is used to calculate the hash value for each of the two or more hash points.

6. A non-transitory computer readable medium comprising code to perform the acts of the method of claim 1.

7. The method of claim 1, further comprising the at least one computer processor verifying the hash value before outputting the hash value into the electronic hash table file.

8. A method, comprising:
receiving an electronic file from a sending system;
receiving a hash table file from the sending system, the hash table file comprising hash values corresponding to two or more hash points for a portion of the received electronic file; and
for each of the hash points:
at least one computer processor reading the portion of the received electronic file from a beginning of the portion of the received electronic file to the hash point;
the at least one computer processor electronically calculating a hash value of the portion of the received electronic file read from the beginning of the portion of the received electronic file to the hash point;
the at least one computer processor comparing the hash value of the portion of the received electronic file read from the beginning of the portion of the received electronic file to the hash point with the hash value corresponding to the hash point in the hash table file to determine whether the portion of the received electronic file was successfully received; and
requesting the sending system to retransmit the received electronic file, in response to a calculated hash value of the portion of the received electronic file read from the beginning of the portion of the received electronic file to a hash point not matching the hash value corresponding to the hash point in the hash table file.

9. The method of claim 8, further comprising the sending system retransmitting the hash table file and the electronic file over a network in response to the request.

10. The method of claim 8, further comprising the at least one computer processor alerting a user in response to a calculated hash value of the portion of the received electronic file read from the beginning of the portion of the received electronic file to a hash point not matching the hash value corresponding to the hash point in the hash table file.

11. The method of claim 8, wherein a Message Digest algorithm is used to calculate the hash value for each of the two or more hash points.

12. The method of claim 8, wherein a Secure Hash Algorithm family algorithm is used to calculate the hash value for each of the two or more hash points.

13. A system, comprising:
at least one computer processor that performs the following:
receive a hash iteration value;
receive a request for an electronic file; and
identify the requested electronic file;
a hash module operating on the at least one computer processor, the hash module operable to determine two or more hash points in a portion of the requested electronic file based on the hash iteration value;
for each of the two or more hash points:
an electronic module on the at least one computer processor operable to read the requested electronic file from a beginning of the portion of the requested electronic file to the hash point;
an electronic module on the at least one computer processor operable to electronically calculating a hash value based at least on the portion of the requested electronic file read from the beginning of the portion of the requested electronic file to the hash point; and
an electronic module on the at least one computer processor operable to output the hash value into an electronic hash table file;
an electronic module operating on the at least one computer processor operable to transmit the requested electronic file and the hash table file over a computer network to a receiving system.

14. The system of claim 13, wherein the requested electronic file is associated with a file size, and the two or more hash points are determined by calculating two or more percentages based at least on the size of the requested electronic file.

15. The system of claim 13, wherein the requested electronic file is associated with a file size, and the two or more hash points are determined by static sizes.

16. The system of claim 13, wherein a Message Digest algorithm is used to calculate the hash value for each of the two or more hash points.

17. The system of claim 13, wherein a Secure Hash Algorithm family algorithm is used to calculate the hash value for each of the two or more hash points.

* * * * *